US008327741B2

(12) United States Patent
Hsieh

(10) Patent No.: US 8,327,741 B2
(45) Date of Patent: Dec. 11, 2012

(54) TORQUE WRENCH AND METHOD FOR DETERMINING ROTATIONAL ANGLE OF TORQUE WRENCH

(75) Inventor: Chih-Ching Hsieh, Taichung County (TW)

(73) Assignee: Chihching Hsieh, Taichung County (TW)

( * ) Notice: Subject to any disclaimer, the term of this patent is extended or adjusted under 35 U.S.C. 154(b) by 296 days.

(21) Appl. No.: 12/699,858

(22) Filed: Feb. 3, 2010

(65) Prior Publication Data

US 2011/0185863 A1 Aug. 4, 2011

(51) Int. Cl.
*B25B 23/144* (2006.01)
*G01L 5/24* (2006.01)

(52) U.S. Cl. .......................... 81/479; 73/862.23; 81/467

(58) Field of Classification Search .................... 81/479, 81/467, 477, 478, 57.14, 57.3, 52; 356/138, 356/625; 73/862.23, 761
See application file for complete search history.

(56) References Cited

U.S. PATENT DOCUMENTS

| | | | | |
|---|---|---|---|---|
| 6,717,166 | B2 * | 4/2004 | Pease | 356/625 |
| 7,082,866 | B2 * | 8/2006 | Becker | 81/479 |
| 7,654,174 | B2 * | 2/2010 | Tachino et al. | 81/57.14 |
| 7,836,794 | B2 * | 11/2010 | Fujioka et al. | 81/52 |

* cited by examiner

*Primary Examiner* — Hadi Shakeri
(74) *Attorney, Agent, or Firm* — CKC & Partners Co., Ltd.

(57) ABSTRACT

A torque wrench includes a wrench body, a torque sensor, an angle sensor, a gravity sensor and a processor. The wrench body can provide a torque to a workpiece. The torque sensor can sense whether the torque is greater than a predetermined torque value. The angle sensor can obtain a rotational angle value by measuring the rotation of the wrench body after the torque is greater than the predetermined torque value. The gravity sensor can sense the tilt angle of the wrench body. The processor is programmed to correct the rotational angle value according to the tilt angle of the wrench body.

18 Claims, 13 Drawing Sheets

TORQUE WRENCH AND METHOD FOR DETERMINING ROTATIONAL ANGLE OF TORQUE WRENCH

BACKGROUND

1. Field of Disclosure

The present disclosure relates to a torque wrench.

2. Description of Related Art

FIG. 1 is a schematic view of a conventional torque wrench. In FIG. 1, the user uses a torque wrench 100 to drive a screw nut 200, the engaging recess of the torque wrench 100 engages the screw nut 200, and the electrical circuit of the torque wrench 100 calculates the torque and the rotational angle. However, the rotational angle always exists the inaccuracy error no matter how precise the accuracy is.

SUMMARY

According to one aspect of the disclosure, a torque wrench is disclosed. The torque wrench includes a wrench body, a torque sensor, an angle sensor, a gravity sensor and a processor. The wrench body provides a torque to a workpiece. The torque sensor senses whether the torque is greater than a predetermined torque value. The angle sensor obtains a rotational angle value by measuring the rotation of the wrench body after the torque is greater than the predetermined torque value. The gravity sensor senses the tilt angle of the wrench body. The processor is programmed to correct the rotational angle value according to the tilt angle of the wrench body.

According to another aspect of the disclosure, a method for determining the rotational angle of a torque wrench is disclosed. The method includes the following steps: A rotational angle value is obtained by measuring the rotational angle of the torque wrench. The tilt angle of the torque wrench is sensed. The rotational angel value is corrected according to the tilt angle of the torque wrench.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
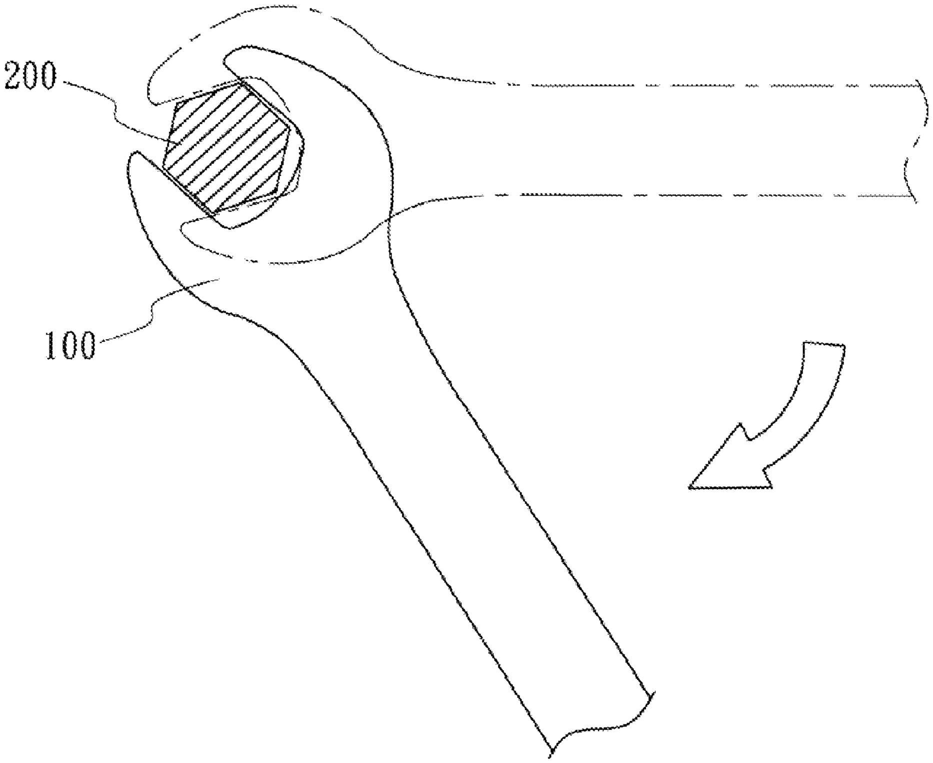
Fig.1 (Prior Art)
FIG. 1 is a schematic view of a torque wrench being operated of the prior art.
Figure 2A:
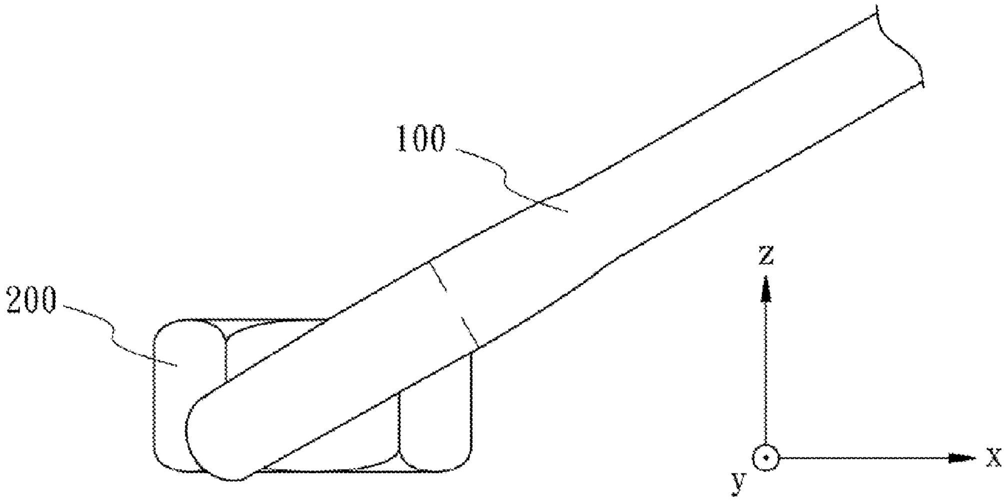
Fig. 2A (Prior Art)
FIGS. 2A-2B are schematic views of torque wrenches being operated with tilt angles, the visual angle is parallel to the y-axis.
Figure 2B:
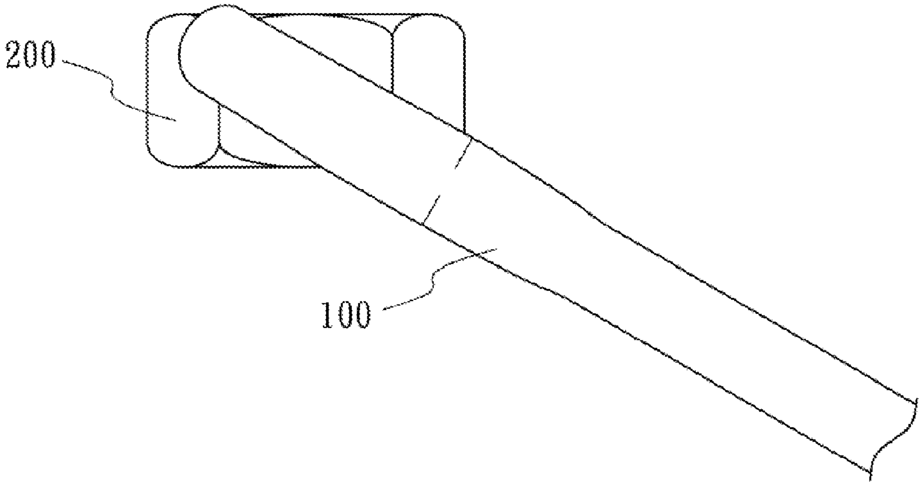
Fig. 2B (Prior Art)

The inventor based on years of experience and long time efforts to find out the source of causing the inaccuracy error of the torque wrench as following:

FIGS. 2A and 2B are schematic views of a torque wrench being operated. The visual angle is parallel to the y-axis. A user engages the torque wrench 100 with the screw nut 200 without considering the tilt angle between the torque angle 100 and the screw nut 200. Therefore, the side surface plane of the head, where the engaging recess is located on, of the torque wrench 100 does not horizontal to the top surface plane of the screw nut 200. In other words, the side surface plane of the head of the torque wrench 100 tilts from the x-y plane to the z-axis. The tilt situation changes the distance between the angle sensor of the torque wrench 100 and the center of the screw nut 200. The shifted distance causes the inaccuracy error since the torque wrench 100 is set to use the distance between the angle sensor and the center of the engaging recess of the torque wrench 100 to calculate the rotational angle.

Figure 2C:
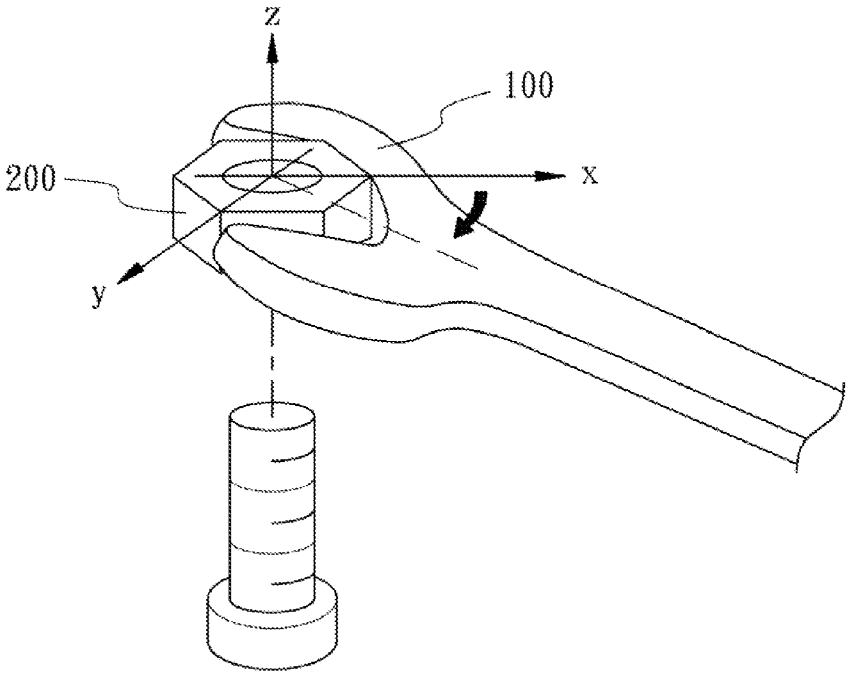
Fig. 2C (Prior Art)
FIG. 2C is an up lateral view of a torque wrench being operated.
Figure 2D:
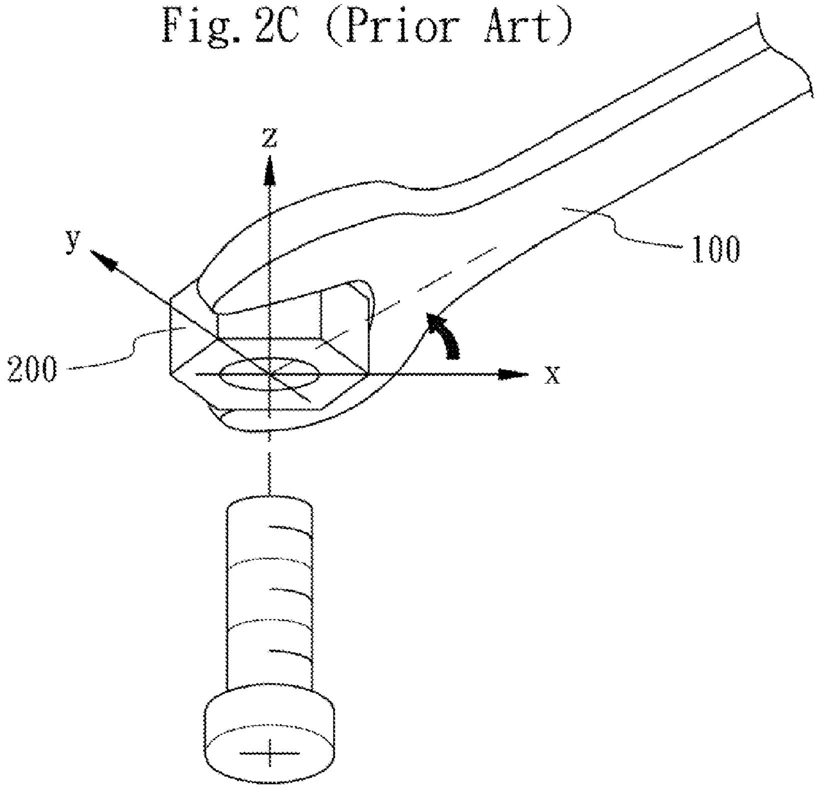
Fig. 2D (Prior Art)
FIG. 2D is a down lateral view of a torque wrench being operated.

FIGS. 2C and 2D depict another two situations that user's operation causes the inaccuracy error. FIG. 2C is an up lateral view of a torque wrench being operated. FIG. 2D is a down lateral view of a torque wrench being operated. As being depicted in FIGS. 2C and 20, the tilt angle not merely occurs in the x-z plane, but also in the y-z plane. In detail, the wrench in FIG. 2C is inclined to the negative z-axis and the positive y-axis, and the wrench in FIG. 2D is inclined to the positive z-axis and the negative y-axis.

Figure 3A:
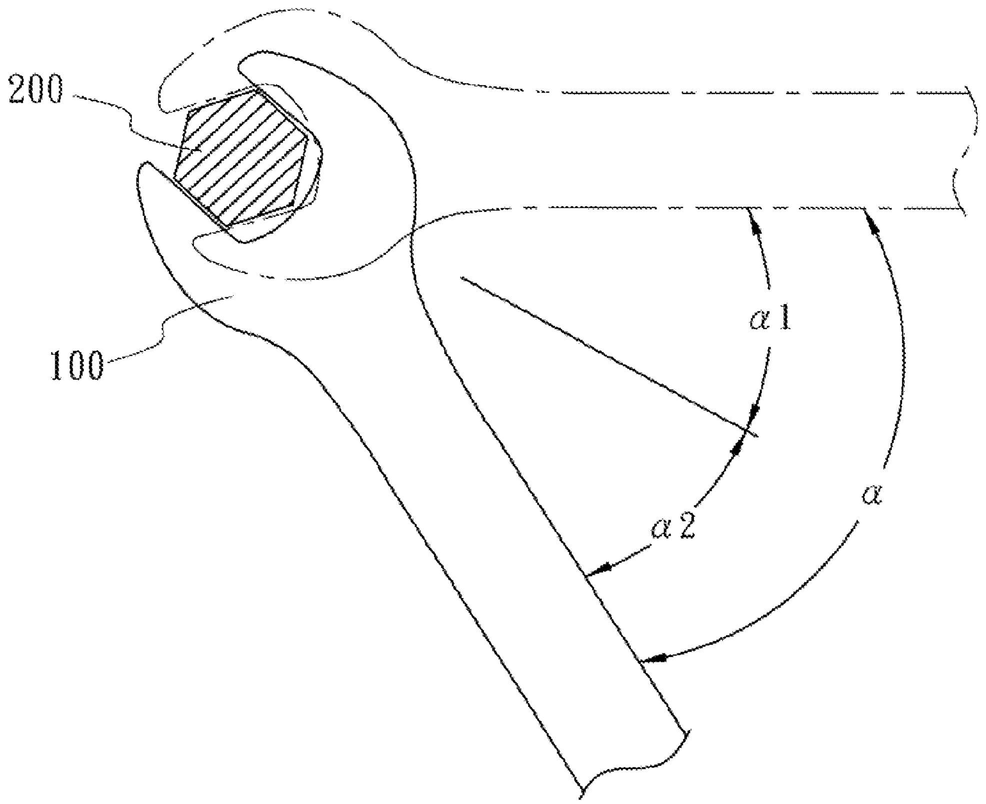
Fig. 3A (Prior Art)
FIG. 3A is schematic view of a torque wrench being rotated in an angle α.
Figure 3B:
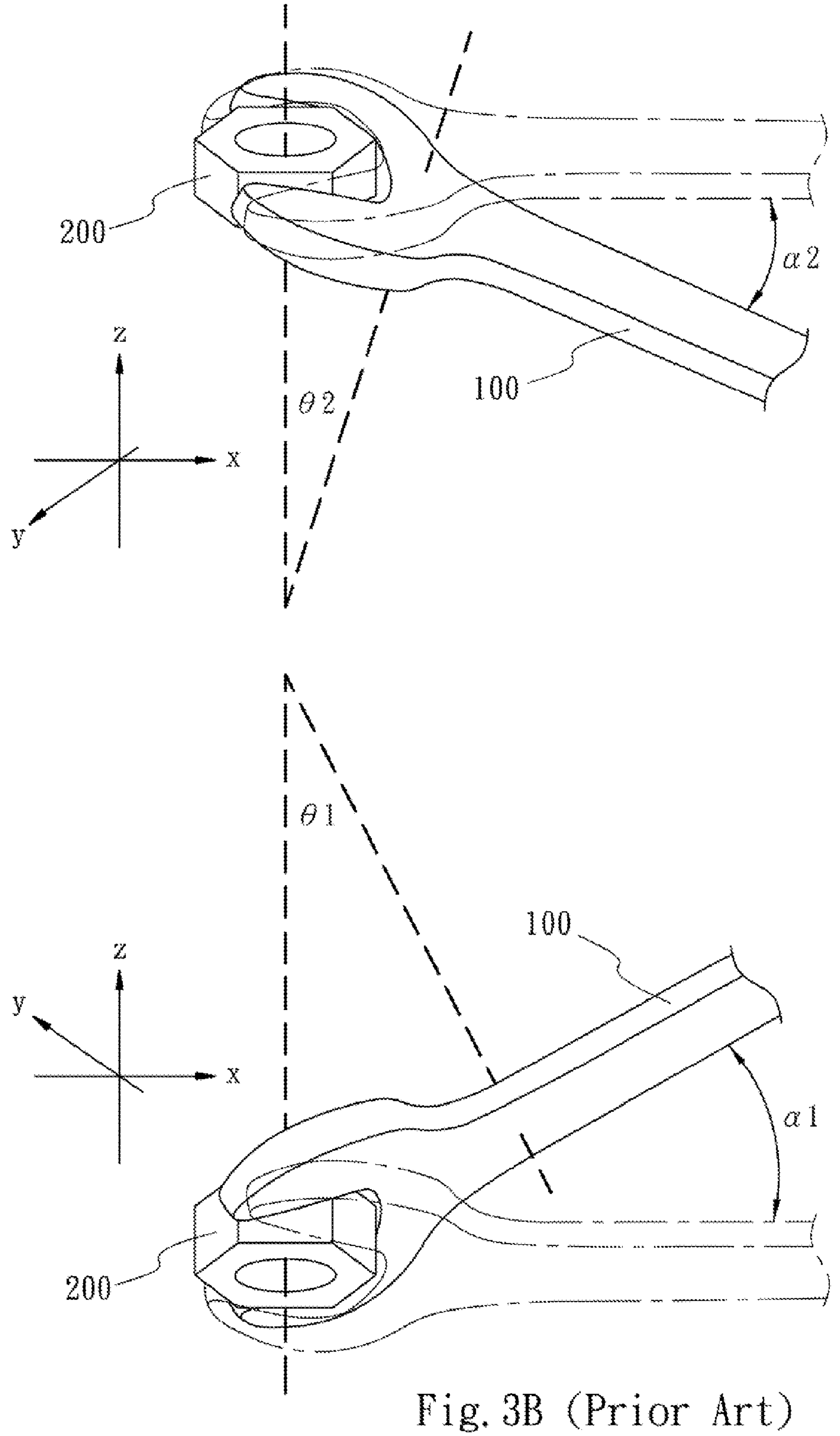
Fig. 3B (Prior Art)
FIG. 3B is a side view of FIG. 3A.

FIG. 3A is a schematic view of a torque wrench being rotated in an angle α. As being described above, when the torque wrench 100 engages the screw nut 200 and rotates the screw nut 200 a angle α, the hand of the torque wrench 100 usually shifts slightly due to the twisting of the wrist. In other words, the torque wrench 100 drives the screw nut 200 a first rotational angle $\alpha 1$ with a first tilt angel, and drives the screw nut 200 a second rotational angle $\alpha 2$ with a second tilt angel. FIG. 3B is a side view of FIG. 3A. The total rotated angle α is the sum of the first rotational angle $\alpha 1$ and the second rotational angle $\alpha 2$ i.e. $\alpha=\alpha 1+\alpha 2$. In detail, as being depicted in FIG. 3B, when the wrench rotates a first angle $\alpha 1$, the tilt angle between the torque wrench 100 and the screw nut 200 is $\theta 1$, but when the user continuously drives the torque wrench 100 to rotate a second angle $\alpha 2$, the tilt angle between the torque wrench 100 and the screw nut 200 is $\theta 2$ due to the user twists his wrist slightly. Since the hand of the user cannot be as stable as the robot, the inaccuracy error cannot be avoided.

Figure 4A:
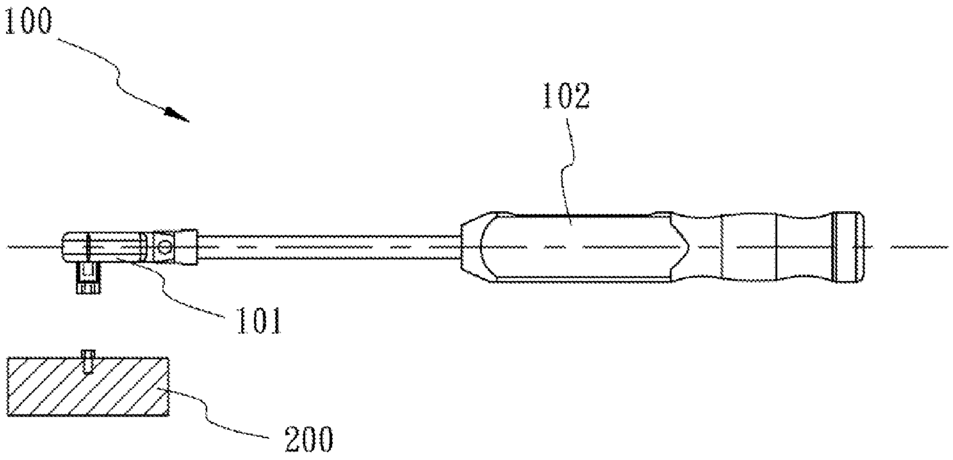
Fig. 4A (Prior Art)
FIGS. 4A-4C are schematic views of a socket torque wrench being operated.
Figure 4B:
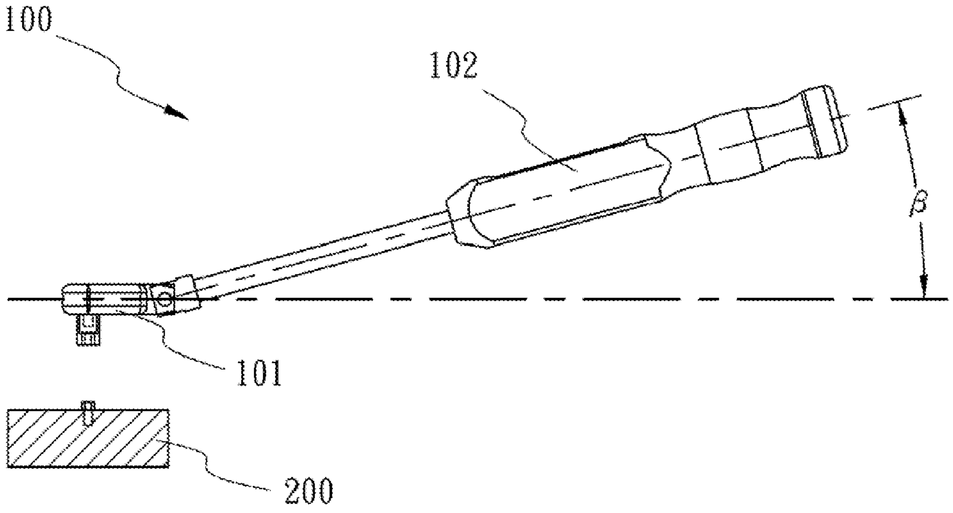
Fig. 4B (Prior Art)
Figure 4C:
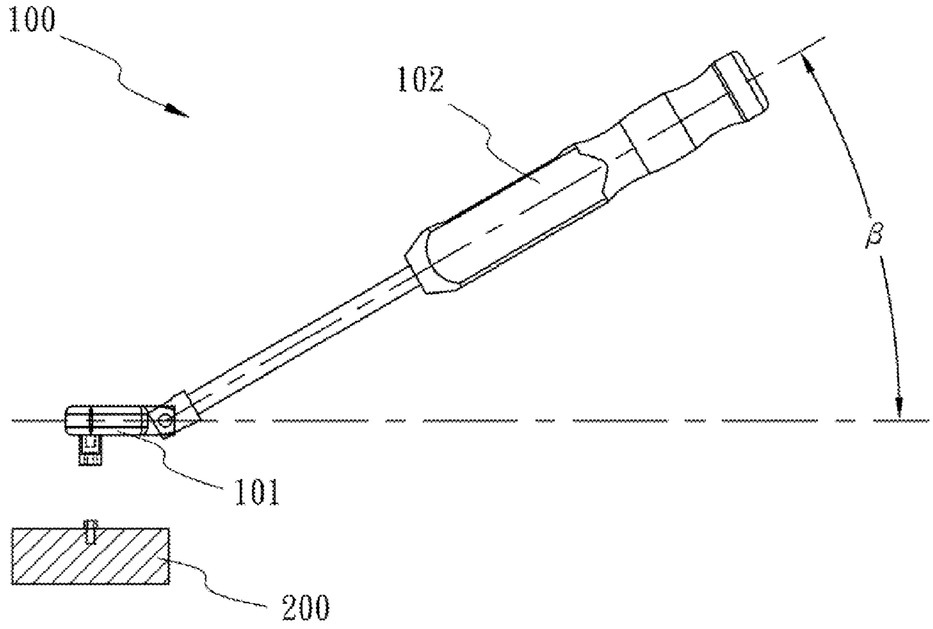
Fig. 4C (Prior Art)

The same problem also happened in the socket torque wrench. FIGS. 4A-4C are schematic views of a socket torque wrench being operated of the prior art. In FIGS. 4A-4C, although driving head 101 of the torque wrench 100 engages the screw nut 200 horizontally, the grip 102 still tilts an angle β. Once the angle sensor is installed in the grip 102, the inaccuracy error also occurred. A skilled one may installs the angle sensor in the driving head 101 after being taught by the description above. However, the size of the driving head 101 is small and the stress applied on the driving head 101 is large. The angle sensor installed in the driving head 101 suffers many drawbacks such as being damaged easily, expensive and low freedom in design. Therefore, the inventor invests much time and experiments to find out the root cause of the inaccuracy error, and provides proposal to overcome the issue.

Figure 5:
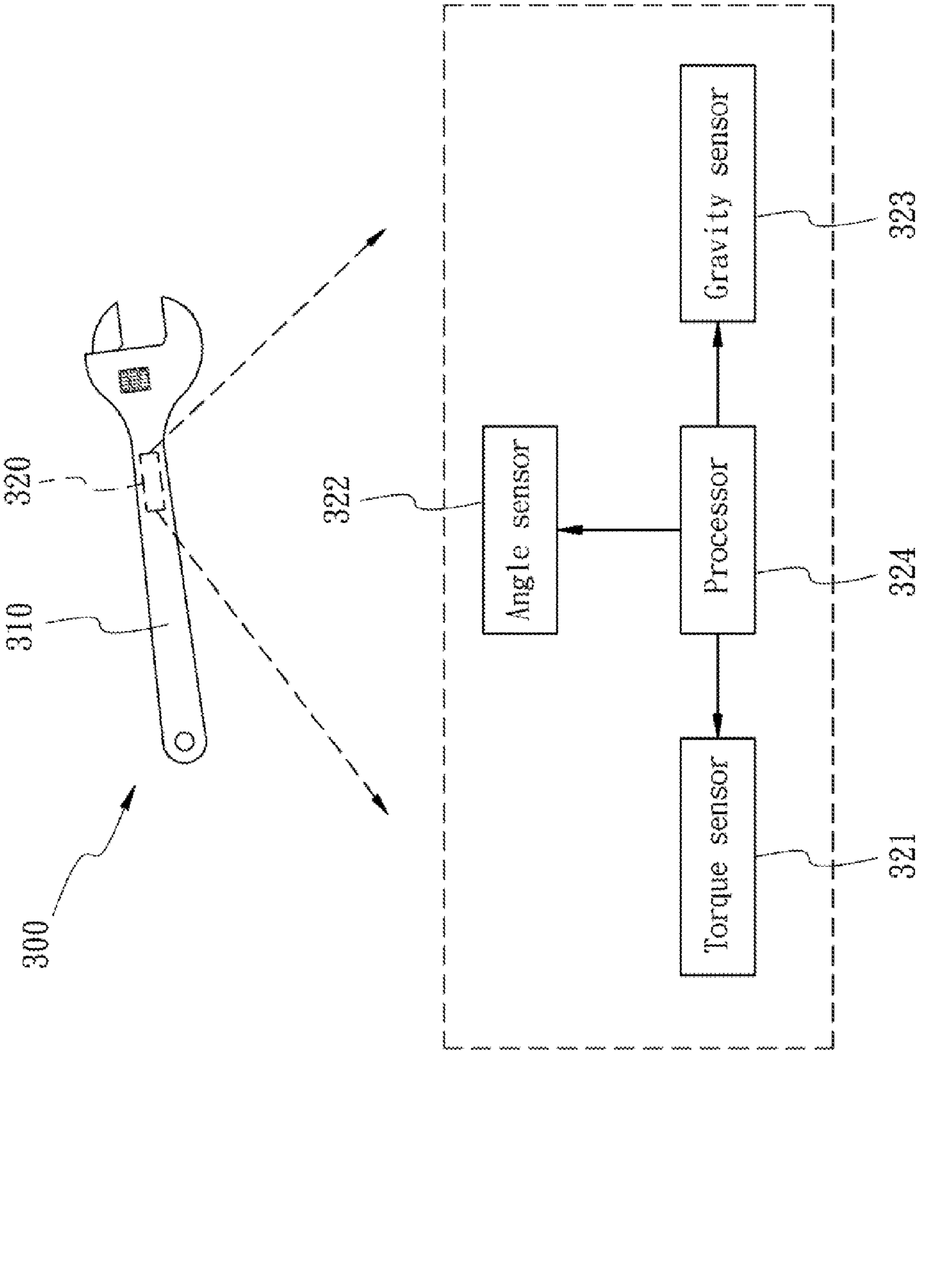
FIG. 5 is a function block diagram of a torque wrench in accordance with one embodiment of the disclosure.

FIG. 5 is a function block diagram of a torque wrench in accordance with one embodiment of the disclosure. In FIG. 5, the torque wrench 300 includes a wrench body 310 and an electrical circuit device 320. The electrical circuit device 320 includes a torque sensor 321, an angle sensor 322, a gravity sensor 323 and a processor 324. The wrench body 310 provides a torque to a workpiece, such as a screw. The torque sensor 321 is applied to sense whether the torque is greater than a predetermined torque value. The angle sensor 322 is applied to obtain a rotational angle value by measuring the rotation of the wrench body 310 after the torque is greater than the predetermined torque value. The gravity sensor 323 is applied to sense the tilt angle of the wrench body 310. The processor 324 is programmed to correct the rotational angle value according to the tilt angle of the wrench body 310.

Take FIG. 3B for instance, the user may drive the torque wrench 100 to move a first angle $\alpha 1$ and then release the stress for a moment, the torque sensor 321 senses his releasing based on the torque is not greater than a predetermined torque value. Therefore, the angle sensor 322 does not work in the moment. Once the user continue to drive the screw nut 200, the torque sensor 321 senses the torque is greater than the predetermined torque value, and the angle sensor 322 calculates the rotational angle continuously. Therefore, the angle sensor 322 outputs the angle value $\alpha=\alpha 1+\alpha 2$. At the same time, the gravity sensor 323 detects the tilt angles $\theta 1$ and $\theta 2$. Therefore, the processor 324 is programmed to use the tilt angles $\theta 1$ and $\theta 2$ to adjust the rotational angle value $\alpha$ and thus diminish the inaccuracy error.

Figure 6:
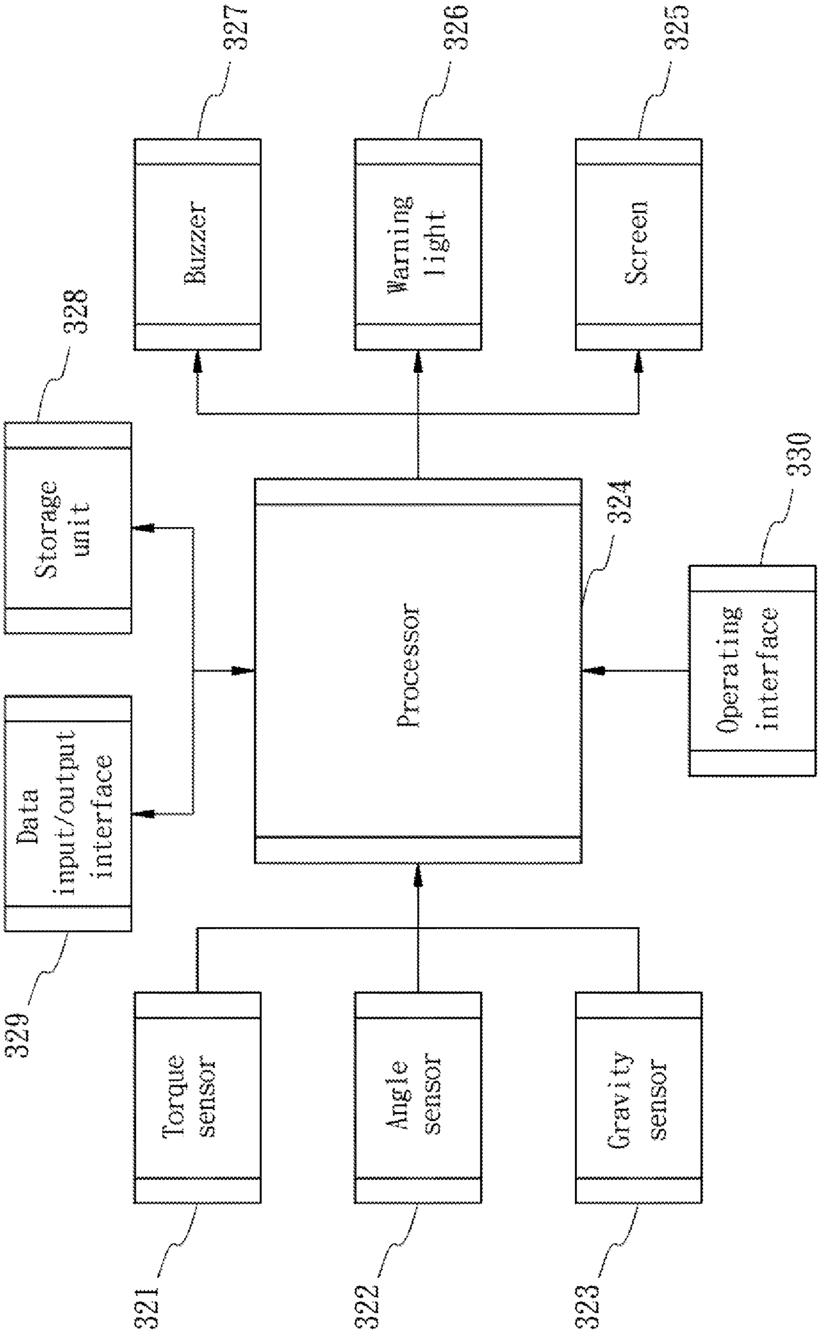
FIG. 6 is a detail function block diagram of FIG. 5.

FIG. 6 is a detail function block diagram of FIG. 5. In FIG. 6, the wrench 300 further includes a display unit for displaying the corrected rotational angle value. In detail, the display unit includes a screen 325, a warning light 326 and a buzzer 327. The screen 325 is applied to show variety kinds of information such as the corrected rotational angle value or the predetermined torque value. The warning light 326 is located on the wrench body 310 to remind the user. The buzzer 327 is also located on the wrench body 310 to remind the user.

On the other hand, the torque wrench 300 also includes a storage unit 328 located in the wrench body 310 to store variety kinds of information, such as the predetermined torque value, the rotational angle value, the value of the tilt angle or the corrected rotational angle value. The torque wrench 300 also includes a data input/output interface 329 which is located on the wrench body 310. The data input/output interface 329 can be a wire or wireless interface to transmit data. The torque wrench 300 also includes an operating interface 330 for the user to key in data or orders.

Figure 7B:
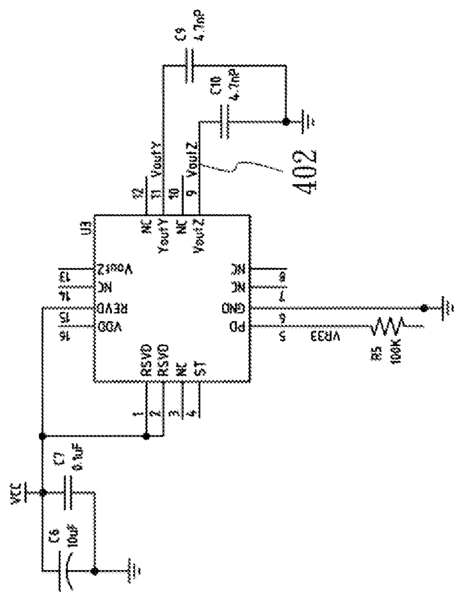
FIG. 7B is a circuit view of the gravity sensor of one embodiment of the disclosure.
Figure 7A:
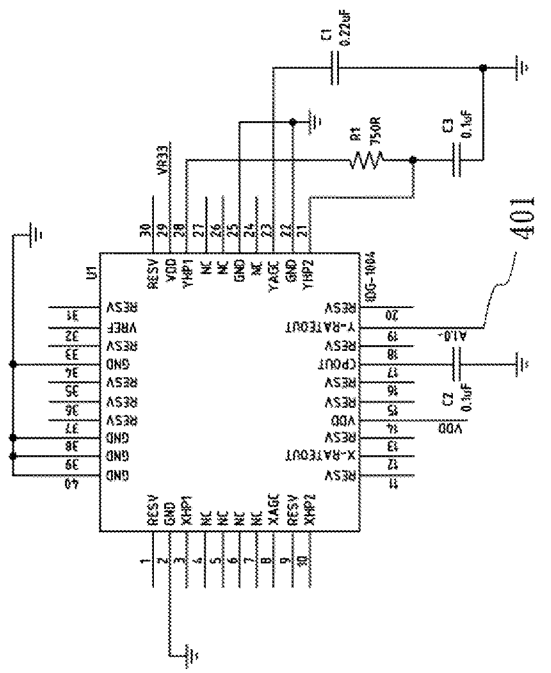
FIG. 7A is a circuit view of the gyroscope chip of one embodiment of the disclosure.

FIG. 7A is a circuit view of the gyroscope chip of one embodiment of the disclosure. In detail, the angle sensor described above can be achieved by a gyroscope chip. The gyroscope chip can be selected from the LY503ALH, the LY510ALH, the LPR510AL, the LPY510AL, the LY5150ALH and the LPY5150AL of the SL family, and the ADXRS610 and the ADXRS613 of the ADI family. Wherein, the output signal of the gyroscope chip is transmitted to the processor 324 via the pin 401.

FIG. 7B is a circuit view of the gravity sensor of one embodiment of the disclosure. In detail, the gravity sensor can be selected from the LIS202DI, the LIS244AL, the LIS331AL, the LIS344AL, the LIS344ALH and the LIS3V02DL of the ST family, and the ADXL325, the ADXL326, the ADXL335, the ADXL345, the ADXL103 and the ADXL203 of the ADI family. Wherein, the output signal of the gravity sensor is transmitted to the processor 324 via the pin 402.

Figure 7C:
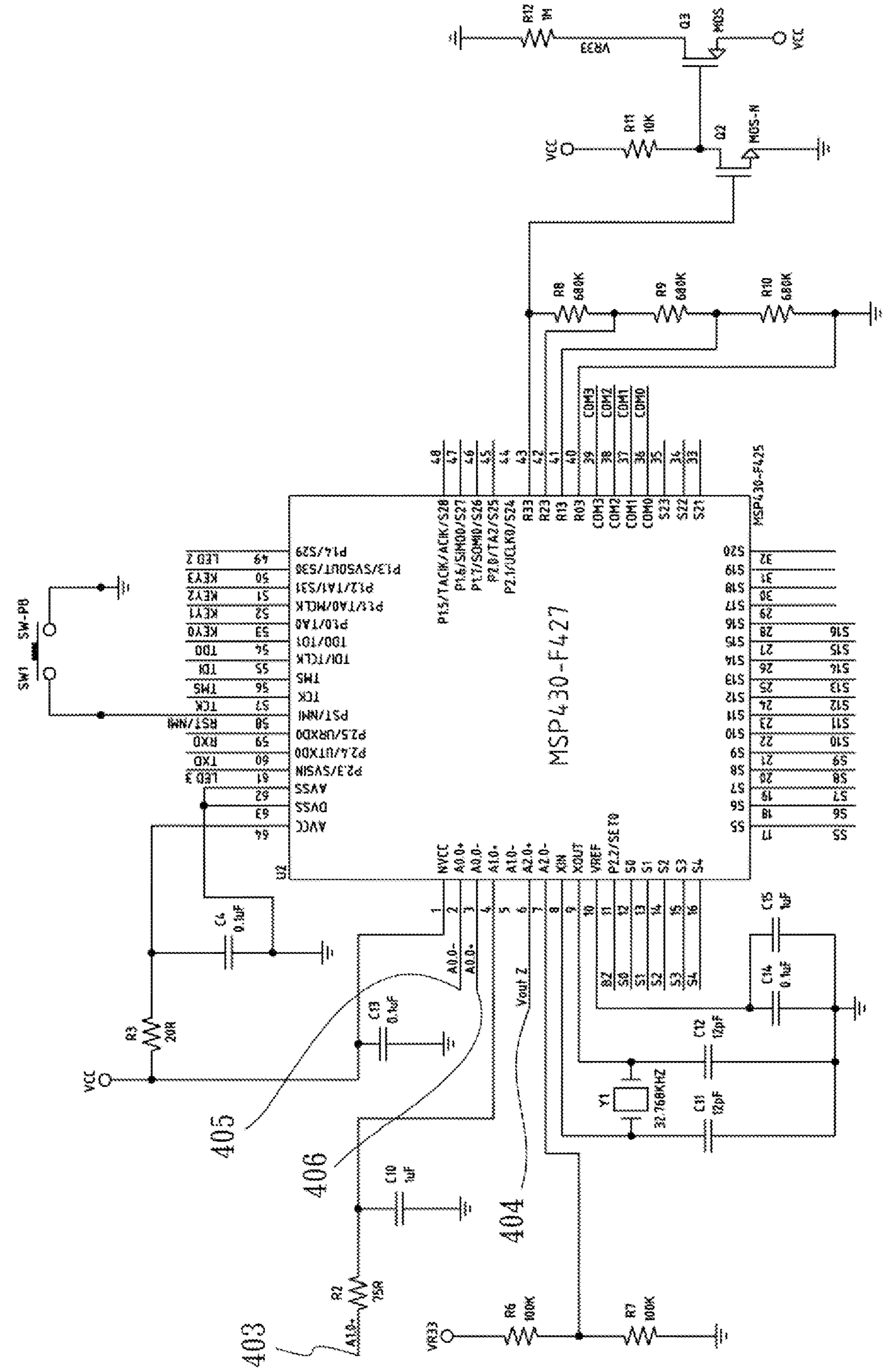
FIG. 7C is a circuit view of the processor of one embodiment of the disclosure.

FIG. 7C is a circuit view of the processor of one embodiment of the disclosure. Take the microprocessor chip, number MSP430-F427, for instance. The MSP430-F427 chip receives the signal from the gyroscope chip via the pin 403. In other words, the pin 403 signally connects the pin 401. The MSP430-F427 chip receives the signal from the gravity sensor via the pin 404. In other words, the pin 404 signally connects the pin 402. And then, the MSP430-F427 chip receives the signal from the torque sensor via the pin 405 and the pin 406.

Figure 8:
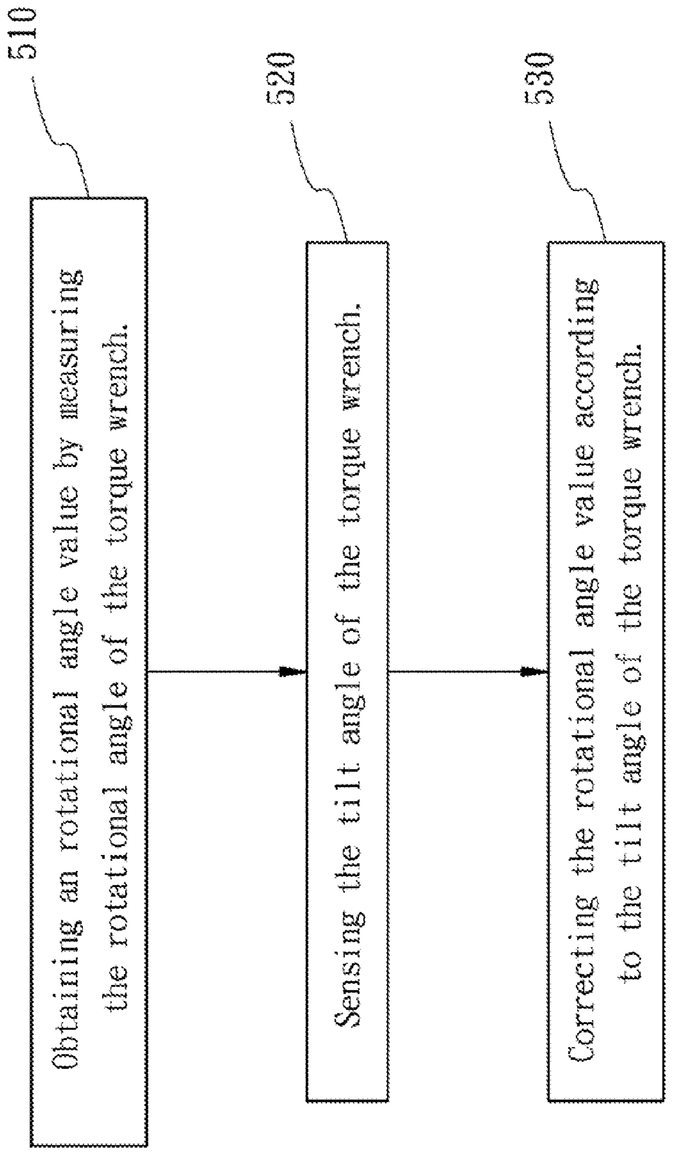
FIG. 8 is a step flowchart of the rotational angle calculating method for a torque wrench of one embodiment of the disclosure.

FIG. 8 is a step flowchart of the rotational angle determining method for a torque wrench of one embodiment of the disclosure. The method includes the following steps: First, as shown in step 510, a rotational angle value of the torque wrench is obtained by measuring the rotational angle of the torque wrench. In detail, an angle sensor is applied to obtain the rotational angle value of the wrench body. Second, as shown in step 520, the tilt angle of the torque wrench is sensed via a gravity sensor. Third, as shown in step 530, the rotational angle value is corrected according to the tilt angle of the torque wrench.

Figure 9:
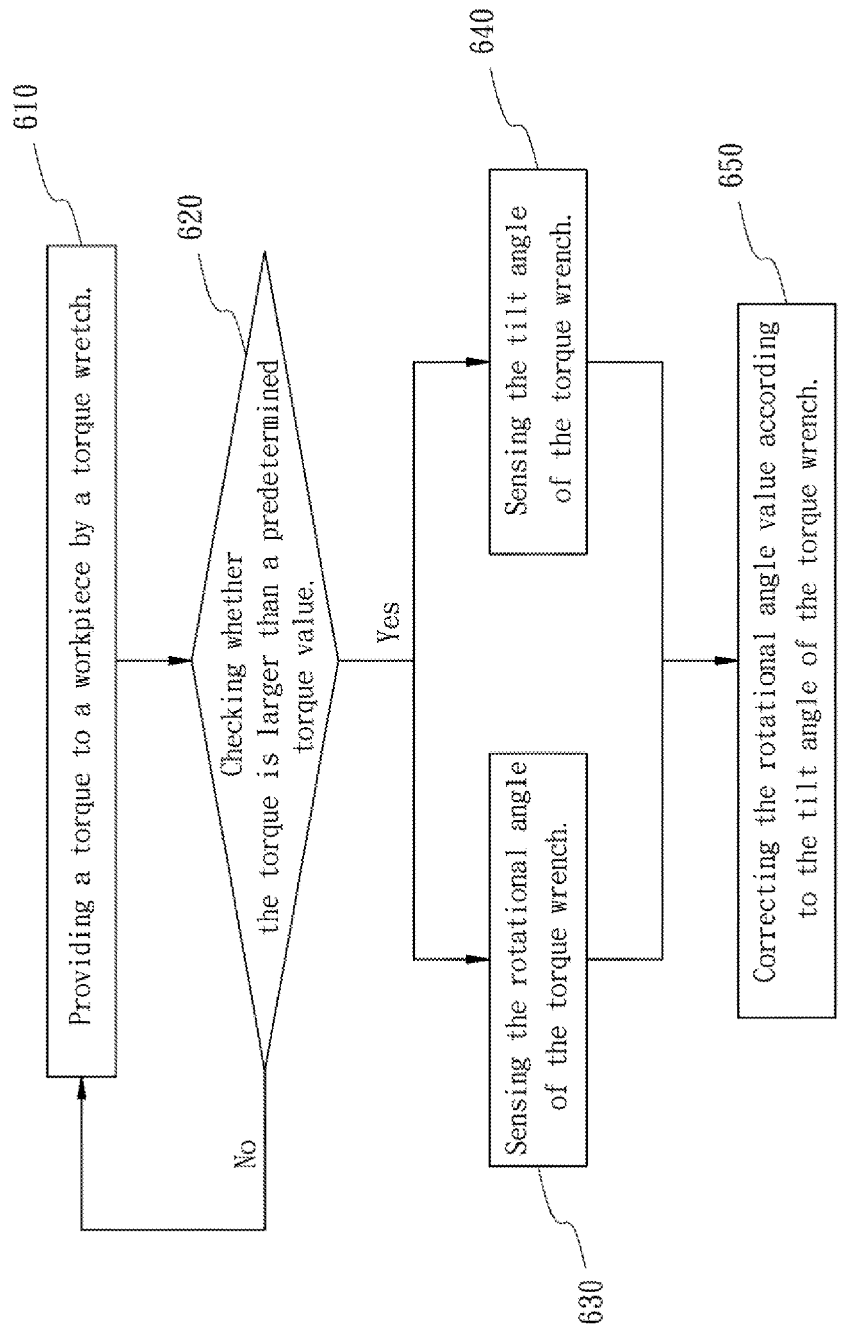
FIG. 9 is a detail step flowchart of FIG. 8.

FIG. 9 is a detail step flowchart of FIG. 8. In FIG. 9, the embodiment includes five steps as following: First, as shown in step 610, a torque is provided to a workpiece. In other words, a torque wrench is applied to drive a workpiece, such as a screw nut. In detail, the torque wrench provides a torque to the workpiece, and a torque sensor is triggered to sense the torque. Second, as shown in step 620, the torque is checked based on a predetermined torque value. In detail, a processor is applied to check whether the torque is greater than a predetermined torque value or not. Furthermore, the torque sensor is triggered by the processor to measure the rotational angle of the torque wrench after the torque is greater than the predetermined torque value. Third, as shown in step 630, the rotational angle of the torque wrench is sensed. In detail, an angle sensor is triggered to measure the rotational angle of the torque wrench while the torque is greater than the predetermined torque value. Wherein, the angle sensor outputs a rotational angle value to represent the rotational angle of the screw nut. As being described above, the angle value includes the inaccuracy error. Forth, as shown in step 640, the tilt angle of the torque wrench is sensed. In detail, a gravity sensor is also applied to sense the tilt angle of the torque wrench. What is worth to notice is that the step 630 and the step 640 can be executed at the same time. Fifth, as shown in step 650, the rotational angle value is corrected according to the tilt angle of the torque wrench. In detail, a processor is applied to calculate the inaccuracy error caused by the tilt angle of the torque wrench. And thus, the rotational angle value is corrected according to the tilt angle. Therefore, the processor diminishes the inaccuracy error of the rotational angle value based on the tilt angle. Additionally, the predetermined torque value can be stored in a memory, and the corrected rotational angle value can be displayed via a screen.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for determining the rotational angle of a torque wrench, the method comprising:

obtaining a rotational angle value by measuring the rotational angle of the torque wrench;

sensing the tilt angle of the torque wrench;

correcting the rotational angle value according to the tilt angle of the torque wrench; and providing a torque to a workpiece by the torque wrench, wherein the rotational angle of the torque wrench is measured after the torque is greater than a predetermined torque value.

2. The method of claim 1, further comprising:

measuring the torque by a torque sensor.

3. The method of claim 1, wherein the rotational angle is measured by an angle sensor.

4. The method of claim 1, further comprising:

storing the predetermined torque value by a memory.

5. The method of claim 1, wherein the tilt angle of the torque wrench is sensed by a gravity sensor.

6. The method of claim 1, further comprising:

displaying the corrected rotational angle value.

7. A torque wrench comprising:

a wrench body for providing a torque to a workpiece;

a torque sensor for sensing whether the torque is greater than a predetermined torque value;

an angle sensor for obtaining a rotational angle value by measuring the rotation of the wrench body after the torque is greater than the predetermined torque value;

a gravity sensor for sensing the tilt angle of the wrench body; and a processor programmed to correct the rotational angle value according to the tilt angle of the wrench body.

8. The torque wrench of claim 7, further comprising:

a display unit for displaying the corrected rotational angle value.

9. The torque wrench of claim 8, further comprising:

a warning light located on the wrench body.

10. The torque wrench of claim 8, further comprising:

a buzzer located on the wrench body.

11. The torque wrench of claim 7, further comprising:

a data input/output interface located on the wrench body.

12. The torque wrench of claim 7, further comprising:

a storage unit located in the wrench body.

13. A torque wrench comprising:

means for providing a torque to a workpiece;

means for sensing whether the torque is greater than a predetermined torque value;

means for obtaining a rotational angle value by measuring the rotation of the torque wrench after the torque is greater than a predetermined torque value;

means for sensing the tilt angle of the torque wrench; and means for correcting the rotational angle value according to the tilt angle of the torque wrench.

14. The torque wrench of claim 13, further comprising:

means for displaying the corrected rotational angle value.

15. The torque wrench of claim 13, further comprising:

means for providing a warning signal when the corrected rotational angle value exceeds a predetermined rotational angle value.

16. The torque wrench of claim 13, further comprising:

means for outputting the corrected rotational angle value.

17. The torque wrench of claim 13, further comprising:

means for inputting the predetermined torque value.

18. The torque wrench of claim 13, further comprising:

means for storing the predetermined torque value.

* * * * *